United States Patent [19]

Riedell

[11] Patent Number: 5,564,217
[45] Date of Patent: Oct. 15, 1996

[54] FISHING ROD HOLDER APPARATUS AND SYSTEM

[76] Inventor: Carl S. Riedell, 178 Scudder Rd., Osterville, Mass. 02655

[21] Appl. No.: 405,597

[22] Filed: Mar. 17, 1995

[51] Int. Cl.$^6$ .................................................. H01K 97/10
[52] U.S. Cl. .............................................................. 43/21.2
[58] Field of Search ........................... 43/21.2; 224/922, 224/200

[56] References Cited

U.S. PATENT DOCUMENTS

| | | | |
|---|---|---|---|
| 1,451,732 | 4/1923 | Hipwood | 43/21.2 |
| 2,539,080 | 1/1951 | Hoover | 43/21.2 |
| 3,287,844 | 11/1966 | Hoxter | 43/21.2 |
| 3,964,706 | 6/1976 | Adams | 43/21.2 |
| 4,498,257 | 2/1985 | Jekel | 43/23 |
| 4,817,323 | 4/1989 | Braid | 43/21.2 |
| 4,828,152 | 5/1989 | Pepping | 43/21.2 X |
| 4,858,364 | 8/1989 | Butts | 43/21.2 |
| 4,887,375 | 12/1989 | Shedd et al. | 43/21.2 |

Primary Examiner—Jeanne M. Elpel
Attorney, Agent, or Firm—Richard P. Crowley

[57] ABSTRACT

A compact, lightweight fishing rod holder which comprises a plastic, tubular, T-shaped holder having an exterior surface with arms and a tube extending from the arms, a layer of cushion material, like foam, about the exterior arcuate surface of the arms opposite the tube, a bar element in the tube to prevent rotation of the fishing rod in use, and an elongated cord secured to the arm at one end and to the fishing rod reel at the other end to secure the fishing rod in place.

18 Claims, 2 Drawing Sheets

FISHING ROD HOLDER APPARATUS AND SYSTEM

BACKGROUND OF THE INVENTION

Gamefishing is typically carried out by employing a fishing rod with a butt end and the rod having a reel thereon adapted to be wound about an axis, and which reel provides for the winding and unwinding of the fishing line with a baited or fly hook at the other end. Gamefishing in either salt or fresh water includes a fisher fighting fish; for example, from a pier or from the deck of a fishing boat. The fisher may employ a fishing rod holder, which can be secured into the ground or to the pier or deck which holder is usually provided with a socket means for holding the butt end of a fishing rod. The fisher may also employ various rod halters, harnesses and belts so that the fisherman may fight the fish in a standing position. These devices, as presently employed, often are large, cumbersome and heavy and are often not desirable. It is desirable to provide for a fishing rod holder to receive the butt end of a fishing rod in a secure manner, so that the fisher may position the butt end of the fishing rod comfortably against the abdomen of the fisher while fighting the fish.

It is therefore desirable to provide for a new and improved fishing rod holder apparatus and system to provide for a simple, inexpensive, effective, easily manufactured fishing rod holder and system to retain the butt end of a fishing rod in a desired position comfortably against the abdomen of a fisher while securing the rod to the holder, and preventing the rotary movement of the fishing rod in the holder, and wherein the fishing rod may be easily placed in and removed from the fishing rod holder.

SUMMARY OF THE INVENTION

This invention relates to a fishing rod holder apparatus and system, and more particularly concerns a simple, compact, lightweight, effective fishing rod holder to receive in t secure manner the butt end of a fishing rod for an individual fisher, and to support the retained fishing rod in use comfortably against the abdomen of the user.

The fishing rod holder apparatus of the invention is adapted for use in the retention of a fishing rod in the holder apparatus, wherein the fishing rod has a butt end and a fishing reel toward the butt end, and with the fishing rod placed within the fishing rod holder. The holder is adapted to be placed against the abdomen of the user in a comfortable and effective manner. The holder comprises a generally T-shaped holder means having a pair of outwardly extending arms with an arcuate exterior surface and a tube extending outwardly from the arms, generally perpendicularly from the axis of the arms and centrally positioned, the tube adapted to receive therein and hold in an effective, snug manner the butt end of a fishing rod inserted therein.

The apparatus includes a resilient cushion means about at least a portion of the exterior surface of the arms, typically at least half of the arcuate exterior surface of the arms, to cushion the arms when the arms of the holder are placed against the abdomen of the user. The cushion generally would comprise a layer of resilient foam or other cushion-type material which may be adhesively secured to the arcuate exterior surface or, with a pre-formed foam tube, may be snapped on and off the arcuate exterior surface of the arms. The apparatus includes a means to retain in a removable manner the butt end of the fishing rod within the tube of the holder. For example, in one embodiment, the apparatus includes a cord means having a one and the other end, one end being adapted to be secured to the T-shaped holder means, and typically to one or the other side, or both sides, of the arm, and the other end adapted to be removably secured to the axis of the fishing reel of the fishing rod, so that the cord means will hold and retain the butt end of the fishing rod in position within the tube of the holder means. Typically the cord means may be elastic or non-elastic and be easily secured generally to the axis of the fishing reel at the other end. The non-elastic cord is easily adjustable in length to adjust for the differences in distance between the fishing reel and the butt end of the various fishing rods, while the elastic cord is selected in length for use with a variety of fishing reels.

The apparatus also includes means to prevent a fishing rod from rotary movement once it is inserted into the tube of the T-shaped holder means, and generally would comprise, but not be limited to, a short cylindrical bar extending across the diameter at the bottom of the tube, which bar is adapted to be placed within a groove or other recess extending across the butt end of the fishing rod, so that when placed in position it would prevent the rotary movement of the fishing rod within the fishing rod holder apparatus.

The invention also includes a fishing rod holder apparatus which contains a fishing rod, wherein the butt end of the fishing rod is inserted into the tube of the holder means, to prevent rotary movement, and wherein a rod retaining means, like a cord means, extending through the fishing reel retains the butt end of the fishing rod in position firmly within the tube to prevent outward movement, and wherein the resilient cushion means about the exterior surface of the arms permits the fisher to place that exterior arcuate surface, generally the back surface of the arm, against the abdomen while fighting the fish.

In one embodiment of the invention, the T-shaped holder means generally comprises a rigid, plastic, T-shaped pipe having tubular, axially aligned arms with a tubular extension extending generally intermediate from the end of the arms outwardly a short distance, with the arms open on each end, the tube selected of a particular diameter to receive snugly the diameter of the butt end of the fishing rod, the holder generally may be comprised of a polyvinylchloride plastic, T-shaped, plumbing-type fixture. The arm section of the T-shaped holder may vary, both in diameter and length, and typically, for example, would comprise from about 3 to 8 inches in length and generally vary in diameter from about 1 to 3 inches. The tube extending from the arms is typically formed as an integral part of the arms and extends outwardly and centrally generally perpendicularly from the axis of the arms, and may also vary in length and diameter; but generally is of a short length, such as ½ to 2 inches, its diameter adapted to fit and receive the appropriate diameter of the fishing rod to be held, typically, but not limited to, ¾ to 1½ inches. The tube may have threads at the outer end so as to receive threadably additional tube inserts, so that the additional tubes may be screwed in as desired to fit the diameter of various fishing rods, or the tube may be a single diameter. Additional tubes may also be added as desired by adhesively securing tubes in place.

A fishing rod may be prevented from rotation by any means; however, one means employed in connection with the present invention is to employ a bar or cylindrical rod which extends across the lower center portion of the tube, generally aligned with the axis of the arm, and which bar is adapted to be received within the groove which is usually present at the end of the butt on the fishing rod, so that when the fishing rod butt is inserted, it fits into the bar when pressed downwardly by the cord means, and prevents the rotary movement of the fishing rod in use.

A cushion means is employed about the exterior surface of the T-shaped holder, and may vary in material and thickness, and generally would comprise for example, an arcuate half of a formed tubing, such as a foam pipe insulating tubing, having a thickness, for example, of ¼ to ½ inch, and may, for example, be a resilient urethane, polyolefin, like polyethylene rubber or polyvinyl chloride, foam tubing. The resilient foam tubing may be merely snapped on to the exterior surface, so that it may be readily replaced when worn, or more particularly adhesively secured in position. Thus, the cushion means should extend around the arcuate back surface of the T-shaped holder arms opposite the tube a sufficient distance, so that it adds comfort to the fisher when the holder is against the fisher's abdomen.

The fishing rod holder also includes a rod retaining means which, in one embodiment, comprises an elongated cord means which extends from one end of the fishing holder arm, and, along with the other end, is adapted to be secured, such as hooked, around the axis of the fishing reel of the fishing rod, or otherwise secured to the fishing reel or any outward appendage extending from the fishing rod. The cord means has a one and the other end adapted to be easily secured to the one end of the fishing rod and to retain the fishing rod in a secured position within the tube of the T-shaped holder. Generally, the one end of the cord means is secured to one, or possibly both, sides of the tube. In one embodiment, the cord means would comprise, for example, a bungee cord, which may range in length from 8 to 16 inches, and which at one end extends through a hole at the top of the generally adjacent tube and is secured within the tube, and the other end contains a hook thereto, which hook is adapted to be placed around the fishing reel axis. When the bungee cord is slightly extended, elastic forces would retain the fishing rod within the tube or the holder means.

In another embodiment, the cord means may comprise, for example, a non-elastic cord which is adjustable at one end, and once again secured to the T-shaped holder through a hole at the top, and the other end forming a loop with a hook attached thereto. The loop is formed by looping the non-elastic cord through an adjustable holder or bead, so that the length of the cord means may be easily adjusted by a fisher, to retain the fishing rod within the T-shaped holder.

Therefore, the fishing rod holder apparatus of the invention provides for a simple, noncomplex, lightweight, efficient, easy to manufacture, easy to operate, fishing rod and holder to which a fishing rod may be secured in a non-rotatory position within the holder, the fishing rod holder in use placed against the abdomen of a fisher to fight a fish.

The invention will be described for the purposes of illustration only in connection with certain preferred embodiments; however, it is recognized that those persons skilled in he art may make various changes, modifications, additions, and improvements to the illustrated embodiments without departing from the spirit and scope of the invention.

DESCRIPTION OF THE EMBODIMENTS

Figure 1:
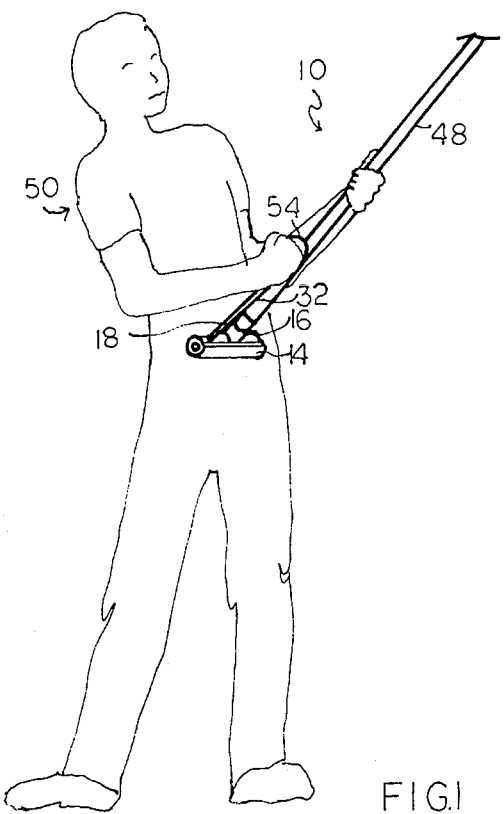
FIG. 1 shows a perspective view from above of the fishing rod holder apparatus of the invention in use with a fishing rod, in partial view, and a partial view of a person holding the apparatus against their abdomen.

As shown in the drawings, FIG. 1 is a perspective view from above of the fishing rod holder of the invention 10 with a fishing rod 48, in position with the cushion area 14 surrounding the arm 16 resting against the abdomen of a user 50. The fishing rod 48 is secured in a non-rotatory manner within the tube 18 by means of the elastic cord 32 extending around the axis 44 of the fishing reel 54 of the fishing rod 48.

Figures 2, 3:
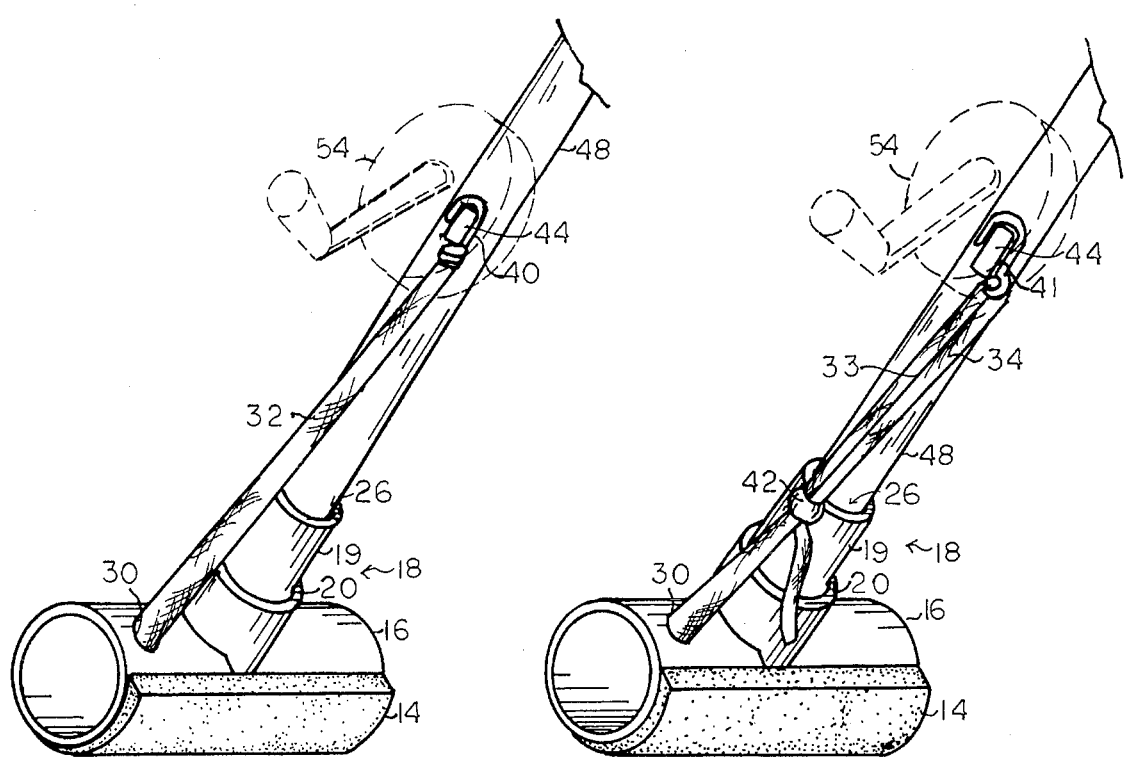
FIG. 2 is a perspective view from above of the fishing rod holder apparatus of the invention with a bungee cord securing the rod to the rod holder.
FIG. 3 is a perspective view from above of the fishing rod holder apparatus with a nonelastic rope securing the rod to the rod holder.

FIG. 2 shows the fishing rod holder of the invention 10 in perspective view with the tubular arm 16 having a cushion material 14 secured thereto. The butt end 26 (see FIG. 4) of the fishing rod 48 is inserted into the outwardly extending tube 18, which is positioned in an outwardly extending perpendicular manner to the arm 16 forming a T-shape. The tube 18 is comprised of an insert portion of the tube 19 within an outer tube 20. The elastic cord 32 is threaded through a hole 30 in the arm member 16 and extended around the axis 44 of the fishing reel 54 of the rod 48 and secured by means of a hook 40 at the end of the elastic cord 32. The fishing reel 54 is shown in broken lines for illustration purposes only.

FIG. 3 shows the fishing rod holder of the invention 10 in perspective view with the tubular arm 16 having a cushion material 14 secured thereto. The butt end 26 (see FIG. 4) of the fishing rod 48 is inserted into the outwardly extending tube 18 with the insert portion of the tube 19 within the outer tube 20. A non-elastic cord 34 is threaded through a cord-receiving hole 30 in the arm member 16 and looped around the axis 44 of the fishing reel 54 of the rod 48 and may be secured by means of a hook 41. The hook is secured to a loop section 33 created by means of a bead 42 on the non-elastic cord 34. The fishing reel 54 is shown in broken lines for illustration purposes only.

The non-elastic cord 34 may also be looped around the axis of the fishing reel 44 and secured by tightening the cord by means of the bead 42, which bead has both ends of the nonelastic cord loop 33 therethrough and allows for the secured adjustment of the cord 34 around the axis 44 of the fishing reel 54.

Figure 4:
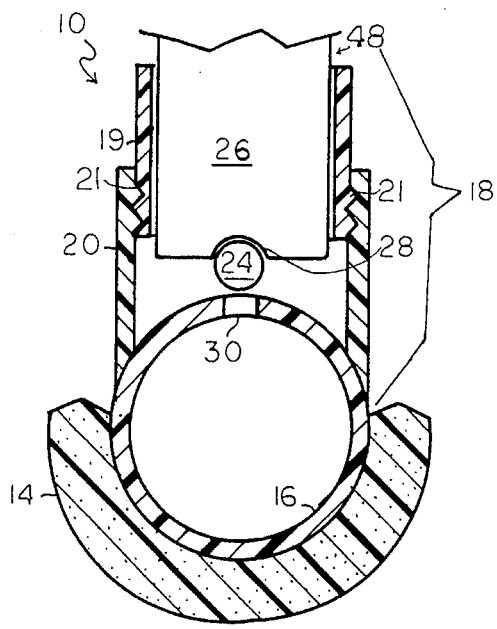
FIG. 4 is an enlarged side sectional view of the fishing rod holder apparatus of the invention with a rod butt end.

FIG. 4 shows an enlarged, side sectional view of the fishing rod holder device of the invention 10, with the butt end 26 of the fishing rod 48 having a groove 28 therein to be matingly fitted into the horizontal bar 24 at the lower end of the tube 18. The tube 18 has an outer portion 20 and an insert portion 19, both having threads 21 thereon, to permit the threadably removable securing of the insert portion 19. The insert portion 19 may be removed and replaced with insert tubes of differing diameters as desired by the user to fit other fishing rods of different diameters.

FIG. 4 also shows the hole 30 for the elastic or non-elastic cord insertion through the arm 16. The resilient-foam type cushion 14 is shown securely wrapped around the arm 16.

The cushion 14 may be either removably secured for easy replacement, or secured by adhesive or other means as desired.

Figure 5:
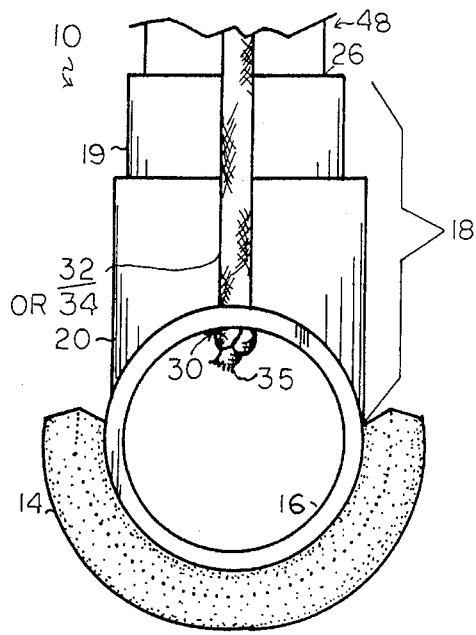
FIG. 5 is a side plan view of the fishing rod holder of the invention.

FIG. 5 shows a side elevational view of the fishing rod holder of the invention 10 with the arm 16 having the cushion material 14 wrapped around. The cord, which may be elastic cord 32 or non-elastic cord 34, is inserted through the hole 30 in the arm 16 and secured in a secure manner by knotting or other means 35, and the butt end 26 of the fishing rod 48 is inserted in the tube 18. It should be noted that either the elastic or the non-elastic cord can be secured in the manner shown as desired by the user.

Figure 6:
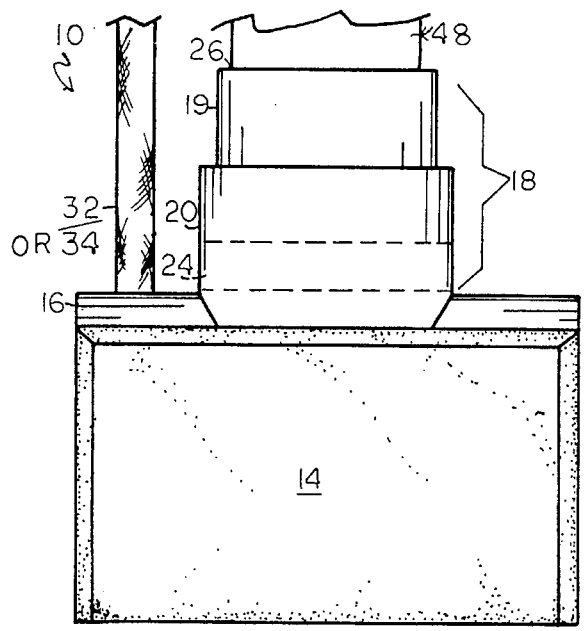
FIG. 6 is a front plan view of the fishing rod holder of the invention.

FIG. 6 shows a front elevational view of the fishing rod holder of the invention 10 with the resilient foam-type cushion 14 wrapped around the arm 16 and the tube 18 extending outwardly perpendicularly therefrom. FIG. 4 also shows the cord, which may be either elastic cord 32 or non-elastic cord 34, extending from the arm 16. The horizontal bar 24, for support of the butt end groove 28 extending across the bottom of the fishing rod 48, is shown in broken lines.

Figure 7:
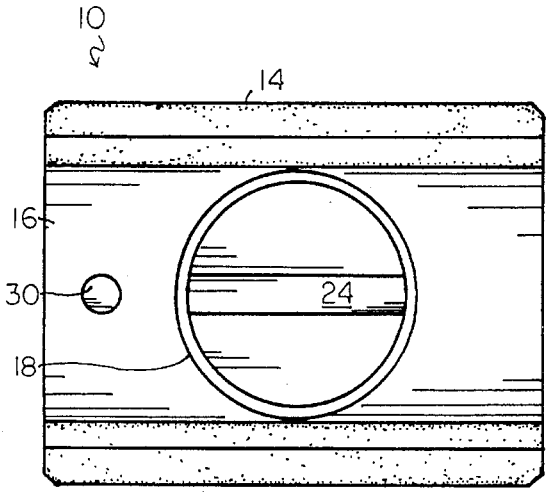
FIG. 7 is a top plan view of the fishing rod holder of the invention.

FIG. 7 shows a top plan view of the fishing rod holder of the invention 10. This view further depicts the horizontal bar 24 extending across the inside of the tube 18 at its lower portion. The cord-receiving hole 30 is also shown, as well as the cushion material 14 wrapped around the arm 16.

In operation, the fishing rod holder device of the invention 10 is used by a fisher to hold a fishing rod 48. The butt end 26 of the rod 48 is inserted into the tube 18, and the groove 28 in the butt end 26 is placed matingly adjacent the horizontal bar 24 at the lower portion of the tube 18. The elastic cord 32, having been secured to the arm 16 of the holder 10 by means of one end being threaded through the cord-receiving hole 30 and knotted or otherwise secured 35, and having a hook 40 at the other end, is hooked around the axis 44 of the fishing reel 54 of the rod 48 to secure the rod in a non-rotatory manner inside the rod holder 10. The fisher 50 may then secure the holder 10 to the abdomen by resting the cushioned exterior surface 14 of the holder 10 against the abdomen.

It should be noted that the non-elastic cord 34 may also be used, with one end secured through the cord-receiving hole 30 in the arm 16 and the other end looped and adjustably secured by means of a bead 42. The cord also has, on the loop portion, a hook 41 to secure the rod holder 10 to the rod 48.

Thus, the invention provides for a lightweight, inexpensive and comfortable means of securing and holding a fishing rod when fishing.

What is claimed is:

1. A fishing rod holder apparatus adapted for use in the retention of a fishing rod having a butt end and a fishing reel with an axis, the fishing rod holder apparatus adapted to be placed against the body of a user, which holder apparatus comprises:
   a) a generally T-shaped holder means having a pair of extending arms defining a continuous exterior arcuate surface, and a tube extending outwardly from the arms, the tube having an opening and adapted to receive within the opening the butt end of said fishing rod to be retained;
   b) cushion means about at least a portion of the exterior arcuate surface opposite the tube, the cushion means comprising a layer of resilient foam of sufficient resiliency and a thickness to cushion the holder means against the body of the user;
   c) cord means having a one and the other end, one end of the cord means secured to the T-shaped holder means, the other end adapted in use to be removably secured to the axis of said fishing reel of the fishing rod in order to hold the butt end of the fishing rod within the tube of the holder means; and
   d) means to prevent the rotary movement of the fishing rod within the tube.

2. The apparatus of claim 1 wherein the T-shaped holder means comprises rigid, plastic tubing, with said arms being tubular arms and the said tube extending generally centrally and perpendicularly outwardly from the said arms.

3. The apparatus of claim 2 wherein the cushion means comprises an arcuate resilient foam layer secured to about half of the continuous exterior surface of the said arms.

4. The apparatus of claim 1 wherein the cushion means is adhesively secured to the exterior surface of the arms.

5. The apparatus of claim 1 wherein the cord means comprises an elastic cord.

6. The apparatus of claim 5 wherein the elastic cord has said one end secured within an opening in one of the arms generally adjacent to the said tube, and the other end has a hook element thereon for attachment to the axis of the said fishing rod reel.

7. The apparatus of claim 1 wherein the cord means comprises a non-elastic cord, one end secured to one of the arms generally adjacent to the tube of the holder means and the other end forming a loop with a hook element thereon to hook on to the axis of the fishing rod reel and containing a means by which the user may adjust the length of the non-elastic cord means so as to retain the fishing rod within the tube.

8. The apparatus of claim 1 wherein the tube includes a tube insert, which tube insert is adapted to be selected based on the diameter of the butt end of the said fishing rod to be inserted into the tube.

9. The apparatus of claim 1 wherein the means to prevent the rotary movement of the fishing rod comprises a bar element extending across a lower end of the tube, and is adapted to be received in a groove in the butt end of the fishing rod.

10. The apparatus of claim 1 wherein the layer of resilient foam comprises an arcuate half of a foam pipe insulating tubing adhesively secured to the said arcuate exterior surface.

11. The apparatus of claim 1 wherein the T-shaped holder means comprises a polyvinyl chloride plastic with the extending arms formed of a single, open-ended, tubular pipe, and the said tube secured to and extending perpendicularly outwardly from the open-ended tubular pipe.

12. The apparatus of claim 1 wherein the layer of resilient foam comprises an arcuate half of a foam pipe insulating tubing which is removably secured in a snap-on relationship onto the arcuate exterior surface.

13. A system which comprises in combination:
   a) said fishing rod having a butt end and said fishing reel with an axis and a fishing line; and
   b) the fishing rod holder apparatus of claim 1 with the butt end of the fishing rod retained in the tube of the apparatus.

14. A fishing rod holder apparatus adapted for use in the retention of a fishing rod having a butt end and a fishing reel with an axis, the fishing rod holder apparatus adapted to be placed against the body of a user, which holder apparatus comprises:
   a) a generally T-shaped holder means comprised of a rigid plastic having a pair of short, extending tubular arms defining a continuous exterior arcuate surface, and a tube extending outwardly from the arms and having a tubular opening adapted to receive the butt end of a fishing rod to be retained;

b) cushion means comprising a resilient foam layer secured to about one half of the arcuate exterior surface of the arms opposite of the tube to cushion the holder mean against the body of the user;

c) an elongated elastic cord means having a one and the other end, one end of the cord means secured within an opening on the T-shaped holder means, the other end having a hook element thereon to be removably secured to or about the axis of the fishing reel in order to retain tensionally the butt end of the fishing rod within the tube of the holder means; and d) means within the tube to prevent the rotary movement of the fishing rod in use, which means comprises a bar element extending across a lower end of the tube adapted to fit into a groove in the butt end of the fishing rod.

15. A fishing rod holder apparatus adapted for use in the retention of a fishing rod having a butt end and a fishing reel with an axis, the fishing rod holder apparatus adapted to be placed against the body of a user, which holder apparatus comprises:

a) a generally T-shaped holder means comprised of a rigid plastic having a pair of short, generally cylindrical extending tubular arms, defining a continuous exterior surface, and a tube extending outwardly from the arms, the tube having a tubular opening and adapted to receive within the tubular opening the butt end of a fishing rod to be retained;

b) cushion means comprising a resilient foam layer secured to about one half of the exterior surface of the cylindrical arms opposite the tube to cushion the holder means against the body of the user;

c) retaining means to retain the butt end of the fishing rod in the tube in use; and d) means within the tube to prevent the rotary movement of the fishing rod in use, which means comprises a bar element extending across a lower end of the tube adapted to fit into a groove in the butt end of the said fishing rod to prevent rotary movement of the fishing rod.

16. The apparatus of claim 12 wherein the retaining means is a cord having one end secured to one of said arms adjacent to the tube, and an opposite end having a means thereon for removable attachment to the said fishing reel.

17. The apparatus of claim 12 wherein the foam layer of the cushion means comprises an arcuate section of foam tubing adhesively secured to the arcuate exterior surface of said arms.

18. The apparatus of claim 12 wherein the apparatus includes a tubular insert secured within the said tube to provide for the retention of said fishing rod having butt ends of different diameters to be used in the holder means.

* * * * *

UNITED STATES PATENT AND TRADEMARK OFFICE
CERTIFICATE OF CORRECTION

PATENT NO. : 5,564,217
DATED : October 15, 1996
INVENTOR(S) : Carl S. Riedell

It is certified that error appears in the above-indentified patent and that said Letters Patent is hereby corrected as shown below:

Column 8, line 17, claim 16, line 1, delete "12" and insert --15--

Column 8, line 21, claim 17, line 1, delete "12" and insert --15--

Column 8, line 25, claim 18, line 1, delete "12" and insert --15--

Signed and Sealed this

Twenty-fourth Day of December, 1996

Attest:

BRUCE LEHMAN

*Attesting Officer*     *Commissioner of Patents and Trademarks*